United States Patent
Lin

(10) Patent No.: US 9,871,443 B2
(45) Date of Patent: Jan. 16, 2018

(54) POWER CONTROL CIRCUIT FOR SETTING TRIGGERING REFERENCE POINT OF OVER CURRENT PROTECTION SCHEME

(71) Applicant: Nuvoton Technology Corporation, Hsinchu (TW)

(72) Inventor: Heng-Lung Lin, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 128 days.

(21) Appl. No.: 14/935,459

(22) Filed: Nov. 9, 2015

(65) Prior Publication Data

US 2016/0170425 A1 Jun. 16, 2016

(30) Foreign Application Priority Data

Dec. 10, 2014 (TW) .............................. 103143008 A

(51) Int. Cl.
*H02M 3/158* (2006.01)
*G05F 1/575* (2006.01)

(52) U.S. Cl.
CPC ............ *H02M 3/158* (2013.01); *G05F 1/575* (2013.01)

(58) Field of Classification Search
CPC ................. H02M 3/155–3/1588; G05F 1/575
See application file for complete search history.

(56) References Cited

U.S. PATENT DOCUMENTS

| | | | | |
|---|---|---|---|---|
| 5,254,926 A * | 10/1993 | Miller | .................. | H02M 7/5395 318/798 |
| 7,315,190 B1 * | 1/2008 | Chen | .................. | H03K 7/08 327/172 |
| 2005/0111242 A1 * | 5/2005 | Oh | .................. | H02M 3/33515 363/21.07 |
| 2006/0043943 A1 * | 3/2006 | Huang | ................. | H02M 3/1584 323/222 |
| 2006/0061340 A1 * | 3/2006 | Wang | ..................... | H02M 3/156 323/267 |
| 2006/0197516 A1 * | 9/2006 | Chiu | ..................... | H02M 3/157 323/282 |
| 2006/0245219 A1 * | 11/2006 | Li | ........................... | G05F 1/565 363/89 |
| 2008/0024101 A1 * | 1/2008 | Huang | .................. | H02M 1/143 323/282 |

(Continued)

FOREIGN PATENT DOCUMENTS

| | | |
|---|---|---|
| TW | 200539544 | 12/2005 |
| TW | 200934130 | 8/2009 |

(Continued)

OTHER PUBLICATIONS

"Office Action of Taiwan Counterpart Application", dated Dec. 1, 2015, p. 1-p. 5.

(Continued)

*Primary Examiner* — Yusef Ahmed
(74) *Attorney, Agent, or Firm* — Jianq Chyun IP Office

(57) ABSTRACT

A power control circuit is provided, which includes a pin and a current source. The current source is electrically coupled to the pin and provides a reference current to the pin to generate a set voltage. The set voltage increases along with time after the current source provides the reference current to the pin. The power control circuit activates an over current protection scheme according to the set voltage.

4 Claims, 2 Drawing Sheets

(56) References Cited

U.S. PATENT DOCUMENTS

| | | | |
|---|---|---|---|
| 2009/0167274 A1* | 7/2009 | Chien | H02M 1/32 323/285 |
| 2010/0253296 A1* | 10/2010 | Huang | H02M 3/1588 323/225 |
| 2011/0122660 A1* | 5/2011 | Cacciotto | H02M 3/33515 363/21.18 |
| 2011/0267128 A1* | 11/2011 | Chen | H03K 19/00369 327/306 |
| 2011/0316509 A1* | 12/2011 | Chen | H02M 1/32 323/282 |
| 2012/0002449 A1* | 1/2012 | Park | H02M 3/33515 363/21.18 |
| 2012/0039007 A1* | 2/2012 | Turchi | H02M 3/1584 361/87 |
| 2012/0113701 A1* | 5/2012 | Wang | H02M 7/53875 363/132 |
| 2012/0224397 A1* | 9/2012 | Yeh | H02M 3/33507 363/21.12 |
| 2013/0049725 A1* | 2/2013 | Yashiki | H02M 3/1563 323/282 |
| 2013/0181772 A1* | 7/2013 | Zhu | H02M 3/33523 330/69 |
| 2013/0235633 A1* | 9/2013 | Yang | H02M 7/06 363/126 |
| 2014/0022010 A1* | 1/2014 | Lai | H02M 3/156 327/574 |
| 2014/0097814 A1* | 4/2014 | Brewster | H02M 3/156 323/282 |
| 2014/0203708 A1* | 7/2014 | Ke | H05B 37/02 315/119 |
| 2015/0023071 A1* | 1/2015 | Lin | H02M 3/33523 363/21.18 |
| 2015/0035508 A1* | 2/2015 | Kim | H02M 3/33507 323/282 |
| 2016/0011613 A1* | 1/2016 | Xu | H02M 3/156 323/280 |

FOREIGN PATENT DOCUMENTS

| | | |
|---|---|---|
| TW | 201106587 | 2/2011 |
| TW | 201138276 | 11/2011 |

OTHER PUBLICATIONS

Doug Mattingly, "Designing Stable Compensation Networks for Single Phase Voltage Mode Buck Regulators," Technical Brief 417, Dec. 2003, pp. 1-10.

* cited by examiner

POWER CONTROL CIRCUIT FOR SETTING TRIGGERING REFERENCE POINT OF OVER CURRENT PROTECTION SCHEME

CROSS-REFERENCE TO RELATED APPLICATION

This application claims the priority benefit of Taiwan application serial no. 103143008, filed on Dec. 10, 2014. The entirety of the above-mentioned patent application is hereby incorporated by reference herein and made a part of this specification.

FIELD OF THE INVENTION

The embodiments of the invention relates to a control circuit. More particularly, the invention relates to a power control circuit.

DESCRIPTION OF RELATED ART

Some electronic devices, such as notebook computers, may receive required power for operations directly from a commercial power system. Such an electronic device is usually equipped with an adapter and a power supply circuit. The adapter converts an AC voltage of the commercial power system into a DC voltage. The power supply circuit further converts the DC voltage generated by the adapter into an operating voltage which is required for each assembly in the electronic device. The assemblies, for example, include processors and memories of notebook computers.

The power supply circuit is usually packaged into an integrated circuit (IC). The power supply circuit has an over current protection scheme to prevent excessive output currents from damaging the electronic device. A set voltage is required for the power supply circuit to determine whether the output current is excessive and the over current protection scheme should be triggered. The set voltage is set by an internal current source of the power supply circuit, a pin of the power supply circuit, and an external resistor which is coupled to the pin. The internal current source of the power supply circuit provides current. The current passes through the pin and the external resistor to form a set voltage, so that different set voltages may be generated by only adjusting the external resistor.

SUMMARY OF THE INVENTION

An embodiment of the invention provides a power control circuit, which makes the setting for a set voltage more flexible and provides more functions with one single pin.

A power control circuit in an embodiment of the invention includes a pin and a current source. The current source is electrically coupled to the pin, and provides a reference current to the pin to generate a set voltage. The set voltage increases along with time after the current source provides the reference current to the pin. The power control circuit activates an over current protection scheme according to the set voltage.

Another power control circuit in an embodiment of the invention includes an amplifier and a pin. The amplifier outputs an error voltage according to a comparison between a reference voltage and a feedback voltage derived from an output voltage which is controlled by the power control circuit. The power control circuit controls the output voltage according to the error voltage. The pin is electrically coupled to the amplifier and configured for providing a frequency compensation to a negative feedback loop which is formed from the error voltage outputted by the amplifier to the output voltage received by the amplifier. The pin is configured for receiving the reference current and generating a set voltage. The power control circuit activates an over current protection scheme according to the set voltage.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
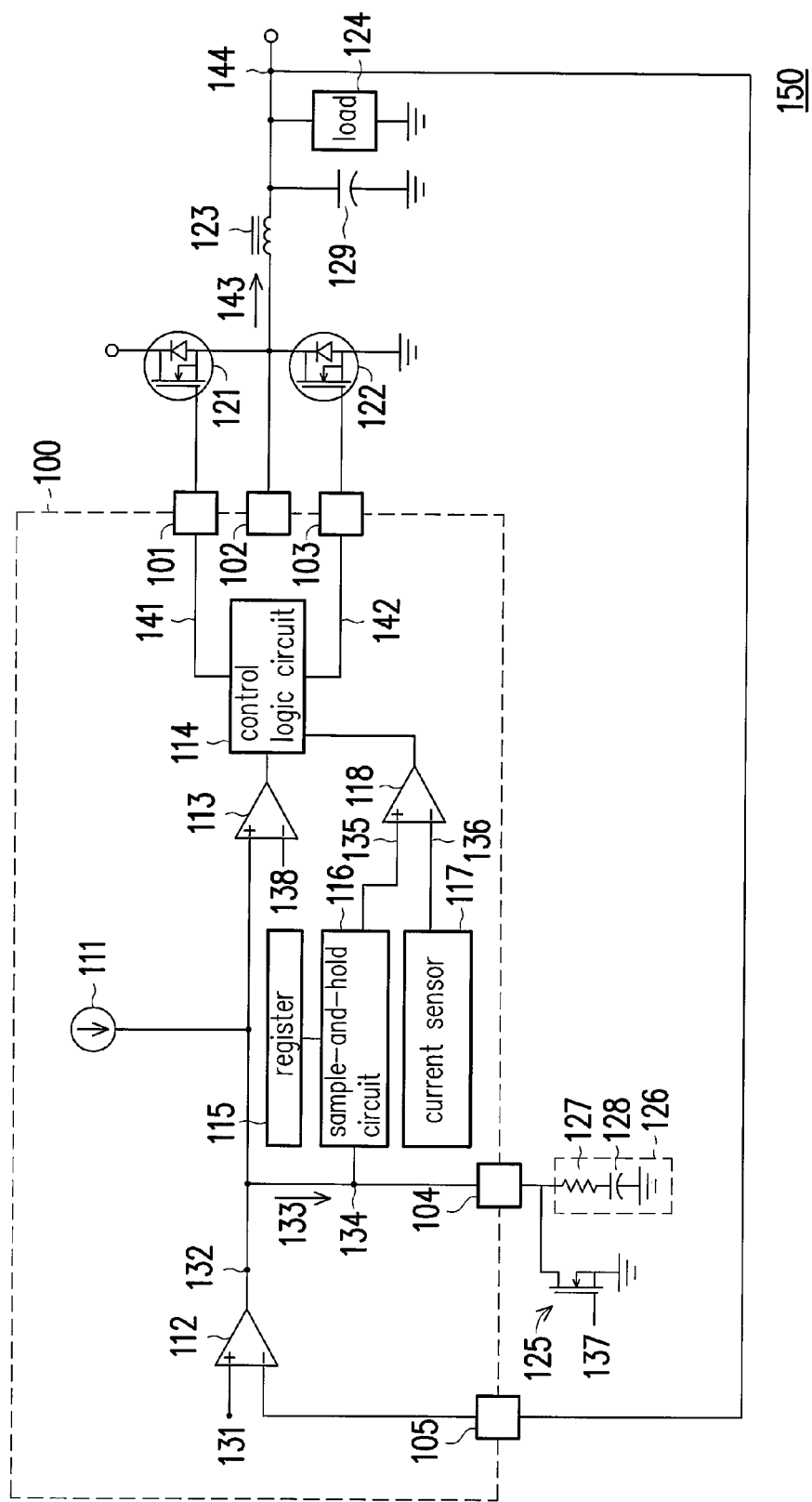
FIG. 1 is a schematic view illustrating a power control circuit according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating a power source circuit 150 and a power control circuit 100 thereof according to an embodiment of the invention. The power control circuit 100 may be packaged into an independent integrated circuit (IC). The power control circuit 100 may include five pins 101 to 105, a current source 111, an error amplifier 112, two comparators 113 and 118, a control logic circuit 114, a register 115, a sample-and-hold circuit 116, and a current sensor 117. In some embodiments of the invention, the power control circuit 100 may be applied in a pulse width modulation (PWM) controller.

The sample-and-hold circuit 116 is electrically coupled to the pin 104. The register 115 is electrically coupled to the sample-and-hold circuit 116. The comparator 118 is electrically coupled to the sample-and-hold circuit 116 and the current sensor 117. The error amplifier 112 is electrically coupled to the pins 104 and 105. The comparator 113 is electrically coupled to the error amplifier 112 and the pin 104. The current source 111 is electrically coupled to the pin 104. The control logic circuit 114 is electrically coupled to the comparator 113 and the pins 101 and 103. The pins 101 to 103 and 105 are electrically coupled to power transistors 121 and 122, an inductor 123, a capacitor 129, and a load 124. The pin 104 is electrically coupled to an activation switch 125 and an external circuit 126. The external circuit 126 may include a resistor 127 and a capacitor 128. The resistor 127 and the capacitor 128 are serially coupled between the pin 104 and ground. In an embodiment, the power transistor 121 and the power transistor 122 may be N-channel metal-oxide-semiconductor field-effect transistors. In other embodiments, the power transistor 121 and the power transistor 122 may also be P-channel metal-oxide-semiconductor field-effect transistors. The embodiments of the invention do not limit types and their arrangements of the power transistor 121 and the power transistor 122. In other embodiments, the power transistor 121 and the power transistor 122 may also be replaced by other switch elements. Similarly, the activation switch 125 may also be a switch element such as an N-channel metal-oxide-semiconductor field-effect transistor, a P-channel metal-oxide-semiconductor field-effect transistor, or other non-metal-oxide-semiconductor field-effect transistors.

The current source 111 may supply a reference current 133. The reference current 133 passes through the pin 104 and the external circuit 126 to generate a set voltage 134. The sample-and-hold circuit 116 may sample the set voltage 134 to be a reference voltage 135 at a predetermined time point. The sample-and-hold circuit 116 may record the reference voltage 135, and output the reference voltage 135.

The current sensor 117 may provide a sensed voltage 136. The sensed voltage 136 is directly proportional to an output current 143 of a power-supply circuit 150 which is controlled by the power control circuit 100. For example, the output current 143 may be detected through the current sensor 117 and the pin 102, and the sensed voltage 136 may be outputted correspondingly. There are various methods for detecting an output current, and the details thereof are omitted thereto.

The comparator 118 may compare the reference 135 to the sensed voltage 136. The reference voltage 135 is a determination basis on whether the output current 143 is excessive. When the sensed voltage 136 is higher than the reference voltage 135, it indicates that the output current 143 has been over-exceeding. When the sensed voltage 136 is higher than the reference voltage 135, the output of the comparator 118 activates the over current protection scheme. For example, when the sensed voltage 136 is higher than the reference voltage 135, the comparator 118 will correspondingly output a digital signal "0". The digital signal may be further provided to, for example, the control logic circuit 114 to execute corresponding ON/OFF operations on the power transistor 121 and the power transistor 122, so as to activate the over current protection scheme. In other embodiments, other types of over current protection schemes may also be adopted, and details of the related schemes are omitted thereto.

The register 115 may receive and store a set value. The sample-and-hold circuit 116 may determine a sampling according to the set value and record a predetermined time point of the set voltage 134. The register 115 may be available to be set up by a user, such that the user may determine a time for sampling the set voltage 134 at discretion. The reference current 133 charges the capacitor 128 of the external circuit 126, such that the set voltage 134 increases along with time. The user may sample the set voltage 134 at different time points to acquire different reference voltages 135.

The error amplifier 112 may output an error voltage 132 according to a comparison between a reference voltage 131 and an output voltage 144 of the power supply circuit 150 which is controlled by the power control circuit 100. The comparator 113 compares the error voltage 132 with a reference voltage 138. The reference voltage 131 is a constant voltage, while the reference voltage 138 is a periodic triangular waveform voltage signal. For example, the reference voltage 138 may be a saw tooth voltage or a ramp voltage.

The control logic circuit 114 generates two pulse signals 141 and 142 according an output of the comparator 113. Briefly, the control logic circuit 114 adopts a pulse width modulation (PWM) technology to control switchings of the power transistors 121 and 122 through the pulse signals 141 and 142, respectively, and further controlling the output voltage 144. An output filter may be composed of the inductor 123 and the capacitor 129, so as to stabilize the output voltage 144. The output voltage 144 is fed back to an inverting input terminal of the error amplifier 112.

In view of the above process, a negative feedback loop is formed from the error voltage 132 outputted by the error amplifier 112 to the feedback voltage of the output voltage 144 received by the error amplifier 112. The external circuit 126 including the resistor 127 and the capacitor 128 may provide frequency compensation to the negative feedback loop through the pin 104, so as to enhance stability of the power supply circuit 150. For example, the power supply circuit 150 may output stabilized voltages by means of frequency compensation.

The pin 104 may affect the error voltage 132 by means of ON state or OFF state of the activation switch 125 so as to control whether the power control circuit 100 and the power supply circuit 150 are activated. The activation switch 125 is coupled between the pin 104 and the ground. Thus, when an activation signal 137 is de-asserted to turn on the activation switch 125, the error voltage 132 is pulled down to a voltage of the ground. At this time, an output of the comparator 113 is maintained at a logic low-level because the error voltage 132 is too low, such that the corresponding pulse signals 141 and 142 stop switching of the power transistors 121 and 122. Thus, the power control circuit 100 and the power supply circuit 150 are turned off.

On the other hand, when the activation signal 137 is asserted to turn off the activation switch 125, the reference current 133 of the current source 111 passes through the external circuit 126 for the error voltage 132 to rise to exceed a predetermined threshold value, such that the comparator 113 and the control logic circuit 114 operates normally. Thus, the power control circuit 100 and the power supply circuit 150 are turned on. In an embodiment, the activation signal 137 may be a signal from an external circuit.

The set voltage 134 is further illustrated below with reference to FIG. 2. The set voltage 134 may be represented by the following equation (1):

$$V_{OCSET}(t) = V_R + dV_C = (I_{OC} \times R_C) + (I_{OC}/C) \times dt \tag{1}$$

In the equation (1), $V_{OCSET}(t)$ is a voltage value of the set voltage 134. $V_R$ is the voltage across the resistor 127. $dV_C$ is the voltage across the capacitor 128. $I_{OC}$ is a current value of the reference current 133. $R_C$ is a resistance value of the resistor 127. C is a capacitance value of the capacitor 128. dt is a length of a charging time of the capacitor 128.

Figure 2:
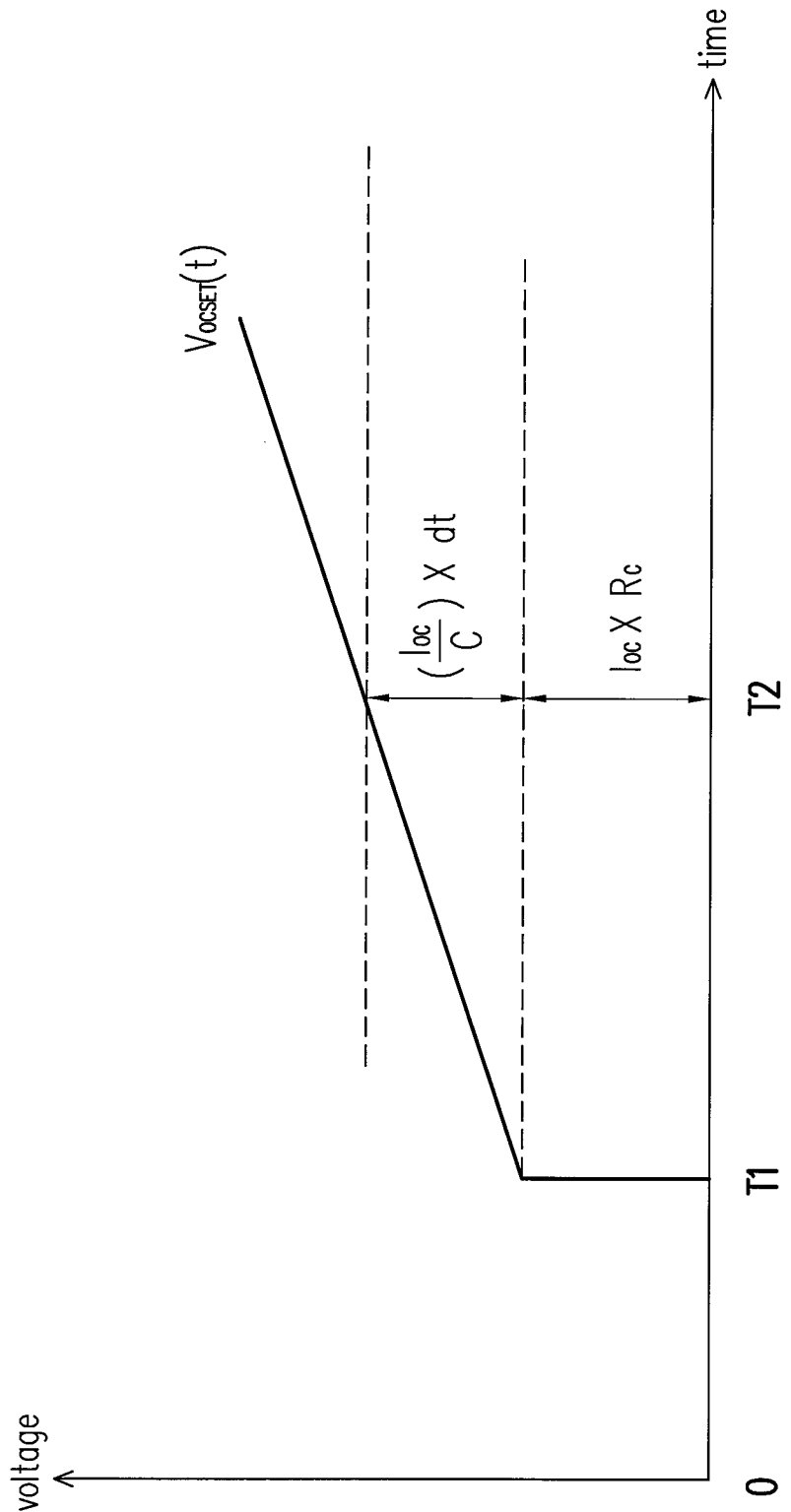
FIG. 2 is a schematic view illustrating a set voltage in a power control circuit according to an embodiment of the invention.

As shown in FIG. 2, the activation signal 137 is set in the beginning to turn off the activation switch 125. The current source 111 starts to supply the reference current 133 to the pin 104 and the external circuit 126 at a time point T1. At the time point T1, the set voltage 134 is equal to the voltage $V_R$ across the resistor 127, i.e., $I_{OC} \times R_C$. And then, a charging of the capacitor 128 allows the set voltage 134 to increase along with time. The user may determine a value of the reference voltage 135 by a set value of the register 115. For example, if a value by a user is set for the sample-and-hold circuit 116 to sample the set voltage 134 at a time point T2, then it is concluded that, according to the equation (1), the reference voltage 135 equals to $(I_{OC} \times R_C) + (I_{OC}/C) \times (T2-T1)$. As described above, the reference voltage 135 may be deemed as a triggering reference point of the over current protection scheme.

A numerical computation of the reference voltage 135 is taken as an example below. In an embodiment of the invention, a current $I_{OC}$ is 10 uA, a resistance value $R_C$ is 10 kΩ, a capacitance value C is 10 nF, and a length of a charging time dt is 1 ms. Accordingly, it is calculated that, according to the equation (1), the reference voltage 135 equals to 1.1 V.

With the equation (1), it is concluded that the reference voltage 135 may be determined by four variables: the current value $I_{OC}$; the resistance value $R_C$; the capacitance value C; and the length of a charging time dt. Consequently, settings of the triggering reference point of the over current protection scheme of the power supply circuit 150 are greatly flexible. For example, a desired set voltage 134 may still be generated with a fixed current or a small current by means of adjusting the capacitance value C and/or the resistance value $R_C$. In some embodiments, the resistance value $R_C$ and the capacitance value C may not be changed because frequency compensation is provided. Even so, different reference voltages 135 may still be acquired by adjusting two variables: the current value $I_{OC}$; and the length of a charging time dt. Such setting flexibility still surpasses the conventional technology which can only adjust one variable (a resistance value).

In summary, the embodiments of the invention can provide extraordinary setting flexibility for the triggering reference point of the over current protection scheme of the power supply circuit. The power control circuit illustrated in the embodiments of the invention can provide multiple functions of circuit activation, frequency compensation, and setting a triggering reference point of the over current protection scheme by adopting only a single pin. With such a design, a plurality of conventional pins may be integrated into one to reduce quantities of pins required for an integrated circuit (IC) packaging. In addition, the embodiments of the invention are compatible with the existing applied circuits. Since the embodiments of the invention can set up a triggering reference point of the over current protection scheme by directly adopting the resistor and the capacitor in the existing compensation network, extra external resistor and external capacitor are no longer required. Thus, the setting for the triggering reference point of the over current protection scheme can be simplified.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A power control circuit, comprising:
   a pin;
   a current source, electrically coupled to the pin, and providing a reference current to the pin to generate a set voltage, wherein the set voltage increases along with time after the current source provides the reference current to the pin, and the power control circuit sample-and-holds the increasing set voltage at a predetermined time point to generate a reference voltage and activates an over current protection scheme according to the reference voltage;
   a sample-and-hold circuit, coupled to the pin, sampling the set voltage as the reference voltage at the predetermined time point, recording the reference voltage, and outputting the reference voltage;
   a current sensor, providing a sensed voltage, wherein the sensed voltage is directly proportion to an output current controlled by the power control circuit; and
   a comparator, coupled to the sample-and-hold circuit and the current sensor, comparing the reference voltage to the sensed voltage, and activating the over current protection scheme when the sensed voltage is higher than the reference voltage.

2. The power control circuit as claimed in claim 1, further comprising:
   a register, coupled to the sample-and-hold circuit, receiving and storing a set value, the sample-and-hold circuit determining the predetermined time point according to the set value.

3. The power control circuit as claimed in claim 1, wherein the pin is coupled to an external circuit, the external circuit comprises a resistor and a capacitor, the reference current passes through the pin and the external circuit to generate the set voltage.

4. The power control circuit as claimed in claim 3, wherein the resistor and the capacitor are serially coupled between the pin and a ground.

* * * * *